US009106950B2

(12) United States Patent
Howarter et al.

(10) Patent No.: US 9,106,950 B2
(45) Date of Patent: Aug. 11, 2015

(54) SYSTEM AND METHOD FOR DISTRIBUTION OF A TELEVISION SIGNAL

(75) Inventors: Jamie Christopher Howarter, Overland Park, KS (US); Charles Michael Lesher, Louisburg, KS (US); Douglas Bruce Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1535 days.

(21) Appl. No.: 12/139,329

(22) Filed: Jun. 13, 2008

(65) Prior Publication Data

US 2009/0313675 A1 Dec. 17, 2009

(51) Int. Cl.
*H04N 21/436* (2011.01)
*H04N 21/4363* (2011.01)
*H04N 21/4402* (2011.01)

(52) U.S. Cl.
CPC ... *H04N 21/43615* (2013.01); *H04N 21/43637* (2013.01); *H04N 21/4402* (2013.01)

(58) Field of Classification Search
None
See application file for complete search history.

(56) References Cited

U.S. PATENT DOCUMENTS

| 6,746,161 B2* | 6/2004 | Imamura ........................ 385/88 |
| 7,992,177 B2* | 8/2011 | Perry et al. ..................... 725/81 |
| 2003/0122966 A1* | 7/2003 | Markman et al. ............. 348/563 |
| 2004/0155722 A1* | 8/2004 | Pruchniak ................... 333/24 R |
| 2007/0273643 A1* | 11/2007 | Erez et al. ..................... 345/156 |

OTHER PUBLICATIONS

Neil Quarmby et al., "Overcoming DSL Set-Top Box Design Challenges for IPTV", Courtesy of *Network Systems Designline*, Feb. 6, 2006.

* cited by examiner

*Primary Examiner* — Mark D Featherstone
(74) *Attorney, Agent, or Firm* — Swanson & Bratschun, L.L.C.

(57) ABSTRACT

A system and method for distribution of media signals. Wireless communications are established between a set-top box and a wireless adapter in communication with a television. The wireless adapter is powered by the television. A signal is received from the set-top box at the wireless adapter. The signal is formatted for wireless communication. The signal is converted to a format displayable by the television. The formatted signal is communicated from the wireless adapter to the television.

12 Claims, 5 Drawing Sheets

SYSTEM AND METHOD FOR DISTRIBUTION OF A TELEVISION SIGNAL

BACKGROUND

The use of and development of media services has grown nearly exponentially in recent years. The growth is fueled by larger networks with more reliable protocols and better communications hardware available to service providers and consumers. In particular, many users receive satellite, cable, Internet Protocol television (IPTV), and other media services for display on one or more televisions within a home, business or organization.

Many media service providers require a large set-top box for each television that receives the media signal. The cost to provide a set-top box for each television may be significant for the user and the communications service provider. Additionally, finding room for each of the large set-top boxes and performing installation may require extensive time and effort.

SUMMARY

One embodiment includes a system and method for distribution of media signals. Wireless communications may be established between a set-top box and a wireless adapter in communication with a television. The wireless adapter may be powered by the television. A signal may be received from the set-top box at the wireless adapter. The signal may be formatted for wireless communication. The signal may be converted to a format displayable by the television. The formatted signal may be communicated from the wireless adapter to the television.

Another embodiment includes a system for communicating a media signal to multiple displays. The system may include a set-top box configured to convert a received signal to a wireless signal. The system may also include one or more wireless adapters in wireless communications with the set-top box. The one or more wireless adapters may be configured to receive the wireless signal, convert the wireless signal to a signal formatted according to a format of one or more of the multiple displays, and communicate the formatted signal to the one or more displays through a hardware interface. The one or more displays may be operable to power the one or more wireless adapters.

Another embodiment includes an powerline adapter for receiving a signal from a set-top box. The powerline adapter may also include a receiver in communication with the power control. The receiver may be operable to receive a wireless signal from a set-top box through a power connection. The wireless adapter may also include a converter in communication with the receiver. The converter may be operable to convert the wireless signal to a formatted signal displayable by the television. The wireless adapter may also include an interface in communication with the converter. The interface may include multiple connectors operable to communicate the wireless signal to the television.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for distributing a television signal from a set-top box to multiple wireless adapters or wired adapters. Certain illustrative embodiments of the adapters are small and non-intrusive. In one embodiment, a wireless adapter may be dongle powered and communicating with the television through a port, an alternating current (AC) adapter or other devices as herein described. In another embodiment, the adapter may be a wire line or powerline adapter that receives communications through power lines or utility connections of a home or business. As a result, the adapters may be simply and efficiently installed to provide a media signal to one or more displays.

Figure 1:
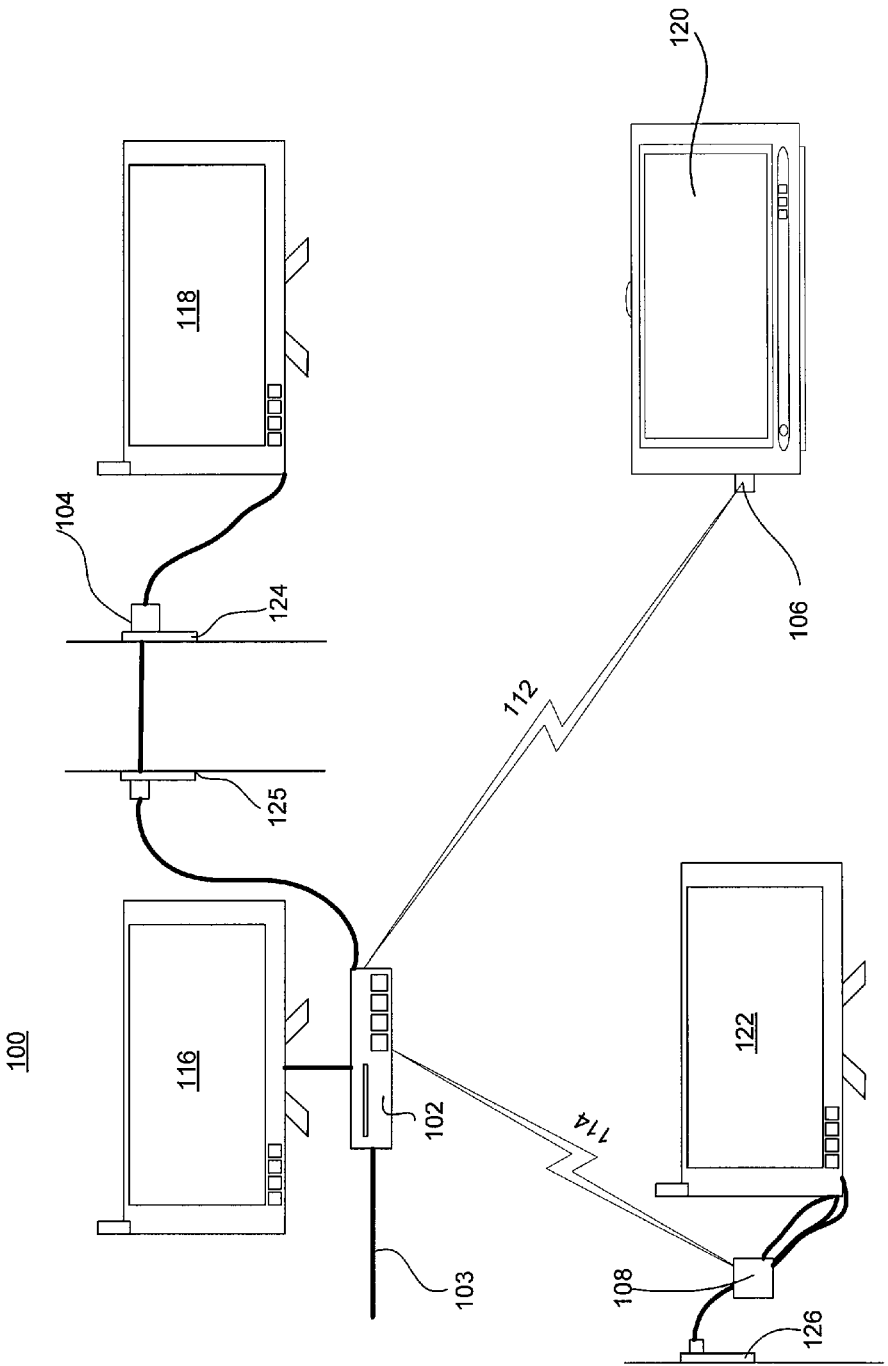
FIG. 1 is a pictorial representation of a set-top box controlling media signals to multiple adapters in accordance with an illustrative embodiment.

FIG. 1 is a pictorial representation of a system for controlling media signals including a set-top box and multiple adapters in accordance with an illustrative embodiment. The system 100 of FIG. 1 may include any number of hardware and software elements. In one embodiment, the system 100 includes a set-top box 102, a video connection 103, powerline adapter 104, wireless adapters 106 and 108, wireless signals 112 and 114, televisions 116, 118, 120, and 122, and power receptacles 124, 125, and 126.

The system 100 illustrates one embodiment of a wireless network or wireless connection between the set-top box 102 and the wireless adapters 106 and 108. The system 100 also illustrates an embodiment of utilizing a powerline network to communicate a signal to the powerline adapter 104. The set-top box 102 is the device components hardware and software utilized to convert incoming signals received through the video connection 103 for display by the television 116 and a wireless signal that may be transmitted to the televisions 120 and 122. The set-top box 102 may also transmit a signal through a power connection and power receptacle 125 through a power network or Ethernet home plug network of the home or building to the powerline adapter 104 for display on the television 118.

In one embodiment, the set-top box 102 may receive the video connection 103 in the form of a video Ethernet connection, satellite signal, cable signal or IPTV signal. For example, the IPTV signal incoming on the video connection 103 may then be converted, formatted or otherwise configured for transmission as the wireless signals 112 and 114 that are displayed by each of the televisions 118, 120, and 122, respectively. The set-top box 102 may similarly convert the video connection 103 to a powerline data or Ethernet signal that may be transmitted to the powerline adapter 104 through any number of cords, wires, outlets, plugs or existing infrastructure. Powerline networking or communication, Ethernet home plug or broadband over power lines is a system for carrying data on a conductor also used for electric power transmissions.

As shown, the set-top box 102 may control the media content displayed by the television 116 or one or more displays. A display is a hardware element configured to display graphical and media content received through the video connection 103. The signal received through the video connection 103 may be directly displayed by one or more displays or may require formatting or conversion to a different format protocol standard or signal type in order to be displayed. The displays may include computer monitors, LCD televisions, plasma televisions organic LCD televisions, personal computers, entertainment devices or other wireless or display devices. For purposes of illustration, each display may be generically referred to as a television.

The video connection 103 is any type of communication connection wired or wireless configured to transmit digital data, packets, an analog signal or other information displayable by the televisions 116, 118, 120, and 122. For example, the video connection 103 may be a cable television line running into a home that provides content that may be both displayed and distributed by the set-top box 102.

In the illustrative embodiments, one or more set-top boxes are not required at each of the televisions 118, 120, and 122 in order to display the media or television content received through the video connection 103. The wireless adapters 106 and 108 may be configured to receive the wireless signals 112 and 114, respectively, from the set-top box 102. The powerline adapter 104 may receive the powerline communication signal through the electrical wiring and connection of the set-top box 102. The wireless signals 112 and 114 and powerline signal may then be converted to a format, standard or protocol by the powerline adapter 104 and wireless adapters 106 and 108 that may be displayed by the televisions 118, 120, and 122. The wireless adapters 106 and 108 are small conversion devices configured to convert or decode the wireless signals 112 and 114 for display by the televisions 120 and 122, respectively. The powerline adapter 104 converts or decodes the powerline signal for display by the television 118. In one embodiment, each of the adapters may be a digital to analog adapter that meets the newest government standards for converting and displaying television and media signals. The various embodiments of the powerline adapter 104 and wireless adapters 106 and 108 are further described in FIGS. 2 and 3.

The wireless adapters 106 and 108 may be electronically powered in any number of ways. In one embodiment, the wireless adapter 106 may be powered by the television 120. For example, the wireless adapter 106 is a dongle that may be connected to one or more ports of the television 120. For example, the wireless adapter 106 may be a small dongle device that may communicate with and be powered by the television 120 through a universal serial bus (USB) connection. The dongle is a small electronic device attachable to a port of the television 120. In one embodiment, a communications service provider may mail one or more wireless adapters 104, 106, and 108 in the form of dongles to the user in order to enable the televisions 118, 120, and 122 to receive media signals from the set-top box 102. In another embodiment, the wireless adapter 104 and 108 may be powered through a connection to the power receptacles 124 and 126. The powerline adapter 104 may both power and communicate a signal to the television 118. In one embodiment, the television 118 may be configured and enabled to receive a signal through powerline communication.

The powerline adapter 104, wireless adapters 106 and 108, and televisions 118, 120, and 122 may include any number of ports or connectors that may be utilized by the wireless adapters 106 and 108 in order to communicate the formatted signal for display. For example, the powerline adapter 104 or the wireless adapter 108 may include any number of connections to the television 122 which may include audio, video, and other connections for communication of the formatted signal. The hardware interfaces and ports that may be utilized by the wireless adapter are further described in FIG. 3. The ports and connectors may also be utilized to receive video content from other devices, such as gaming systems, digital video recorders, personal video recorders or other media devices that display content to the televisions 116, 118, and 120.

The set-top box 102 may communicate with the wireless adapters 106 and 108 using any number of channels or radio frequencies. In one embodiment, one of the wireless signals 112 and 114 may be a WiFi® signal or Bluetooth®, such as IEEE 802.11(n) signal. The wireless signals 112 and 114 may utilize two dedicated channels to effectively communicate with the wireless adapters 106 and 108 without interference or cross-talk. For example, the televisions 118, 120, and 122 may simultaneously display different media content available through the set-top 102 and video connection 103. Based on a user selection through a remote control or the televisions 118, 120, and 122, the powerline adapter 104 and wireless adapters 106 and 108 may request separate media content. As a result, the set-top box 102 may separate the video content received through the video connection 103 for transmission to each of the wireless adapters 106 and 108 through the wireless signals 112 and 114, respectively. The set-top box 102 may separate the wireless signals 112 and 114 from a composite video single signal received through the video connection 103. In another embodiment, the connection 103 may include any number of different Ethernet streams or data streams that may be converted or utilized directly as the wireless signals 112 and 114. Similarly, the set-top box 102 may utilize different channels, frequencies or encoding schemes for one or more wired adapters.

In one embodiment, the set-top box 102 may include a digital video recorder (DVR), personal video recorder or network client configured to record or save media content received through the video connection 103 or through separate devices interconnected with the set-top box 102. In one embodiment, the video connection 103 is a satellite or WiMax connection to a satellite receiver embodied as the set-top box 102.

The illustrative embodiments may allow a communication service provider to more easily accommodate the needs and requirements of individual users. In particular, the user of the wireless adapters 106 and 108 may insure that additional wiring is not necessary to provide high quality media content to the televisions 118, 120, and 122. Similarly, the communications service provider may not be required to subsidize the cost of purchasing multiple set-top boxes that are much larger and more expensive than the wireless adapters 106 and 108.

Figure 2:
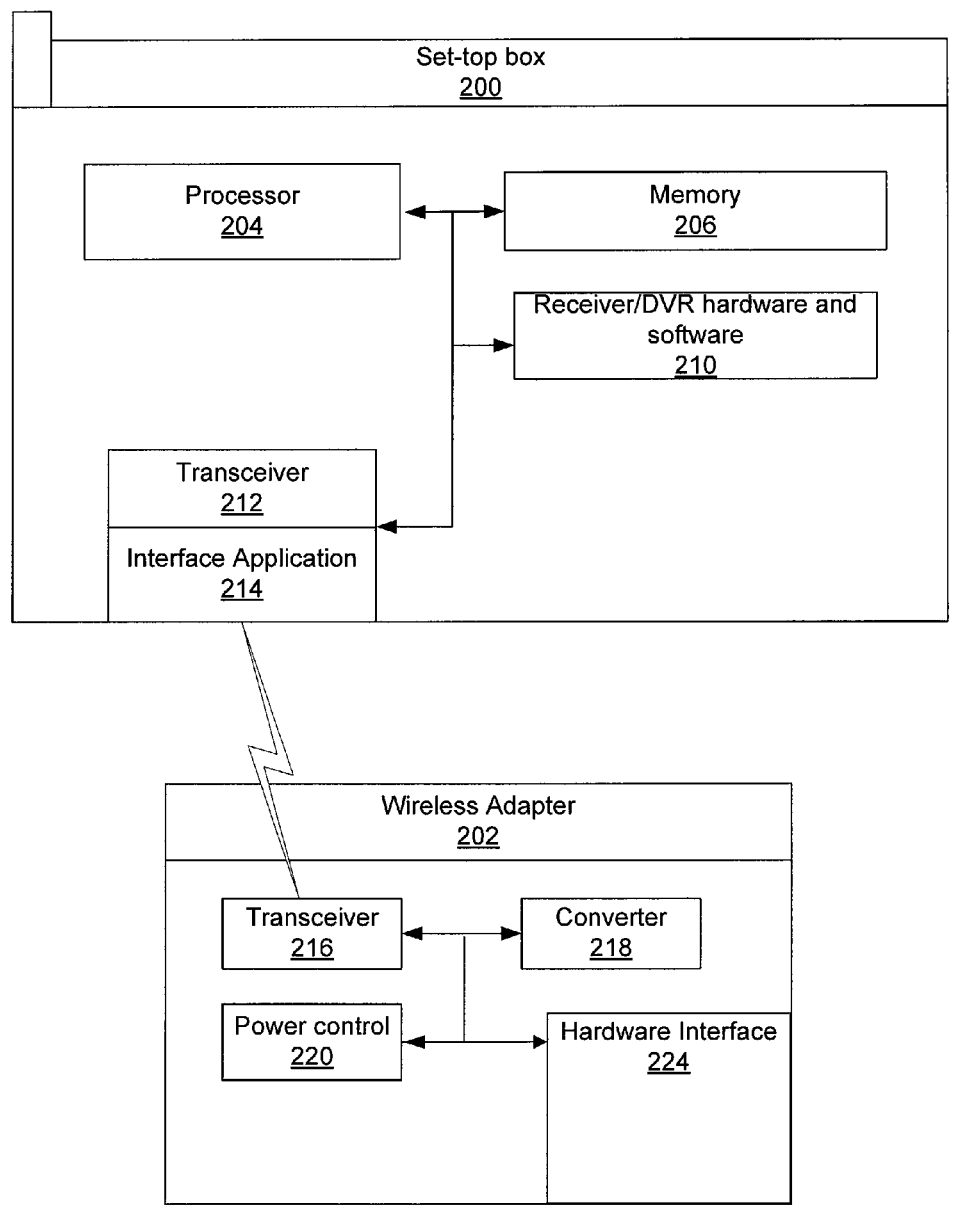
FIG. 2 is a block diagram of a system for distributing a television signal in accordance with an illustrative embodiment.

FIG. 2 is a block diagram of a set-top box and wireless adapter for distributing a television signal in accordance with an illustrative embodiment. The set-top box 200 and the wireless adapter 202 are particular implementations of the set-top box 102 and the wireless adapters 106 and 108 of FIG. 1. The wireless adapter 202 may also be an adapter that may be used for wireless communication or powerline communication. The set-top box 200 and the wireless adapter 202 may include any number of hardware and software components. In one embodiment, the set-top box 200 may include a processor 204, a memory 206, receiver/DVR hardware and software 210, a transceiver 212, and an interface application 214. The wireless adapter 202 may include a transceiver 216, a converter 218, a power control 220, and a hardware interface 224.

The processor 204 is circuitry or logic enabled to control the execution of a set of instructions. The processor 204 may be a microprocessor, digital signal processor, central processing unit or other device suitable for controlling an electronic device including one or more hardware and software elements, executing software, instructions, programs and applications, converting and processing signals and information, and performing other related tasks. The processor 204 may be a single chip or integrated with other computing or communications elements. In particular, the processor 204 may convert and format an incoming signal for display by one or more televisions and transmission to one or more wireless adapters.

The memory 206 is a hardware element, device or recording media configured to store data for subsequent retrieval or access at a later time. The memory 206 may be static or dynamic memory. The memory 206 may include a hard disk, random access memory, cache, removable media drive, mass storage or configuration suitable as storage for data, instructions, and information. In one embodiment, the memory 206 and processor 204 may be integrated. The memory may use any type of volatile or non-volatile storage techniques and mediums. In one embodiment, the wireless adapter 202 may also include a processor and memory.

The receiver/DVR hardware and software 210 is the component utilized to receive, buffer, record, and perform the other standard functions of the set-top box 200. The transceiver 212 is a component configured to transmit and receive signals from the set-top box 200 to the wireless adapter 202. Similarly, the transceiver 212 may receive signals from the wireless adapter 202 to process commands, receive user input, and otherwise carry on the functions as herein described.

The transceiver 212 may communicate with the transceiver 216 of the wireless adapter 202 using any number of wireless standards, protocols or formats. In one embodiment, the transceiver 212 may communicate with the receiver 216 using a channel of a WiFi signal. The WiFi signal may be designated for use or integrated as part of a home wireless network utilized by the user. In another embodiment, the transceiver 212 may use a Bluetooth signal or equivalent to communicate with the transceiver 216. The different wireless signals or channels utilized by the transceiver 212 may vary based on the media content, television channel or other programming selected by a user utilizing the television interconnected to the wireless adapter 202.

The transceiver 212 may also communicate with the powerline adapter using powerline network communication standards, protocols, and formats. For example, the transceiver 212 may format an incoming video signal for communication through a power or electrical connection of the set-top box 200. The formatted signal may then be decoded by one or more powerline adapters as received.

The interface application 214 is a program application or module configured to work with the transceiver 212 or independently to communicate with the transceiver 216. In one embodiment, the interface application 214 may be configured to separate an incoming satellite, data, cable or other signal received by the set-top box 200 for distribution to one or more wireless adapters and powerline adapters including the wireless adapter 202. For example, the signals required by each of the wireless adapters may be dependent on a television program channel or other selection of a user. As a result, the interface application 214 may communicate with the transceivers of the one or more wireless adapters using dedicated channels or other protocols to insure that there is no interference cross-talk or other signal continuity problems. The interface application 214 may also format different Ethernet, DSL, cable, satellite or other signals received by the set-top box 200 for any number of displays.

In one embodiment, the interface application 214 may require an authentication key or identifier in order to send a formatted signal to the wireless adapter 202 or a powerline adapter. For example, the user may be required to enter an authentication code, password, hardware identifier or other information through a display connected to the wireless adapter 202 or the set-top box 200 in order to communicate the media signal. For example, when the wireless adapter 202 or powerline adapter is initially connected to the display, the user may be required to enter a 16 digit software key. The authentication information ensures that the signals broadcasted from the transceiver 212 are not utilized by an unauthorized user. Additionally, other existing security or authentication methods and systems may be utilized. In one embodiment, the wireless adapter 202 may need to be directly connected to the set-top box 200 in order to be enabled.

In the illustrative embodiments, formatting of the incoming signal for transmission from the set-top box 200 to the wireless adapter 202 may be performed by any of the components of the set-top box 200 including the processor 204, the receiver/DVR hardware and software 210, the transceiver 212, and the interface application 214. In another embodiment, the different components of the set-top box 200 as shown in FIG. 2 may be software modules that may be stored in the memory 206 and executed in order to manage and transmit the wireless signals to the wireless adapter 202.

The wireless adapter 202 is a conversion device configured to receive a wireless signal and format the wireless signal for display. The wireless adapter 202 may include a transceiver 216 for communicating with the set-top box 200. Primarily, the transceiver 216 receives signals from the set-top box 200, but the transceiver 216 may also send signals regarding the utilization and selections of a user through an interconnected display, such as a television. For example, when a user changes the channel or elects to use an interconnected device, such as a DVD player, the transceiver 216 may send data information or other indicators to the transceiver 212 indicating the current request or usage of the wireless adapter 202.

The converter 218 is a conversion device for formatting, decoding or otherwise processing the wireless signal received from the set-top box 200 for display. In one embodiment, the converter 218 may convert the wireless signals into a high definition format, a standard format, and any number of other formats that may utilize an interconnected television or display. In particular, the converter 218 may communicate each of the different formats to the hardware interface 224. The various ports and connectors that may be integrated with the hardware interface 224 are further described in FIG. 3.

The hardware interface 224 is the connectors, ports or other receptacles that may be utilized to communicate the formatted signal to the television. For example, the hardware interface 224 may include a coaxial composite video, audio, high definition multimedia interface (HDMI), USB, firewire, and other types of connectors or ports that may allow the wireless adapter 202 to transmit the formatted signal directly or indirectly through a communications link, line or connection. For example, an Ethernet cord may be utilized between the hardware interface 224 and video input port of the television.

The power control 220 is the hardware and elements for powering the wireless adapter 202. In one embodiment, the wireless adapter 202 is a dongle that may be powered through a port or other interface element of the display. For example, the wireless adapter 202 may be inserted in a USB port of the television for powering the wireless adapter 202 and communicating the formatted signal from the converter 218. As a result, the hardware interface 224 and power control 220 may function together to both communicate the formatted signal, data, and information from the television as well as power the wireless adapter 202. The power control 220 may also receive an electrical connection for powering the wireless adapter 202 through a standard alternating current plug, cord or socket.

In another embodiment, the wireless adapter 202 is enabled for powerline communication as well. The power control 220 may be integrated with the transceiver 216 to receive powerline signals from the set-top box 200 for display by the television. The powerline adapter may communicate the formatted signal through a power cord of the television if the television is configured to receive a powerline signal. In another embodiment, the hardware interface of the powerline adapter may include one or more ports and connectors for sending the formatted media signal to the television.

Figure 3:
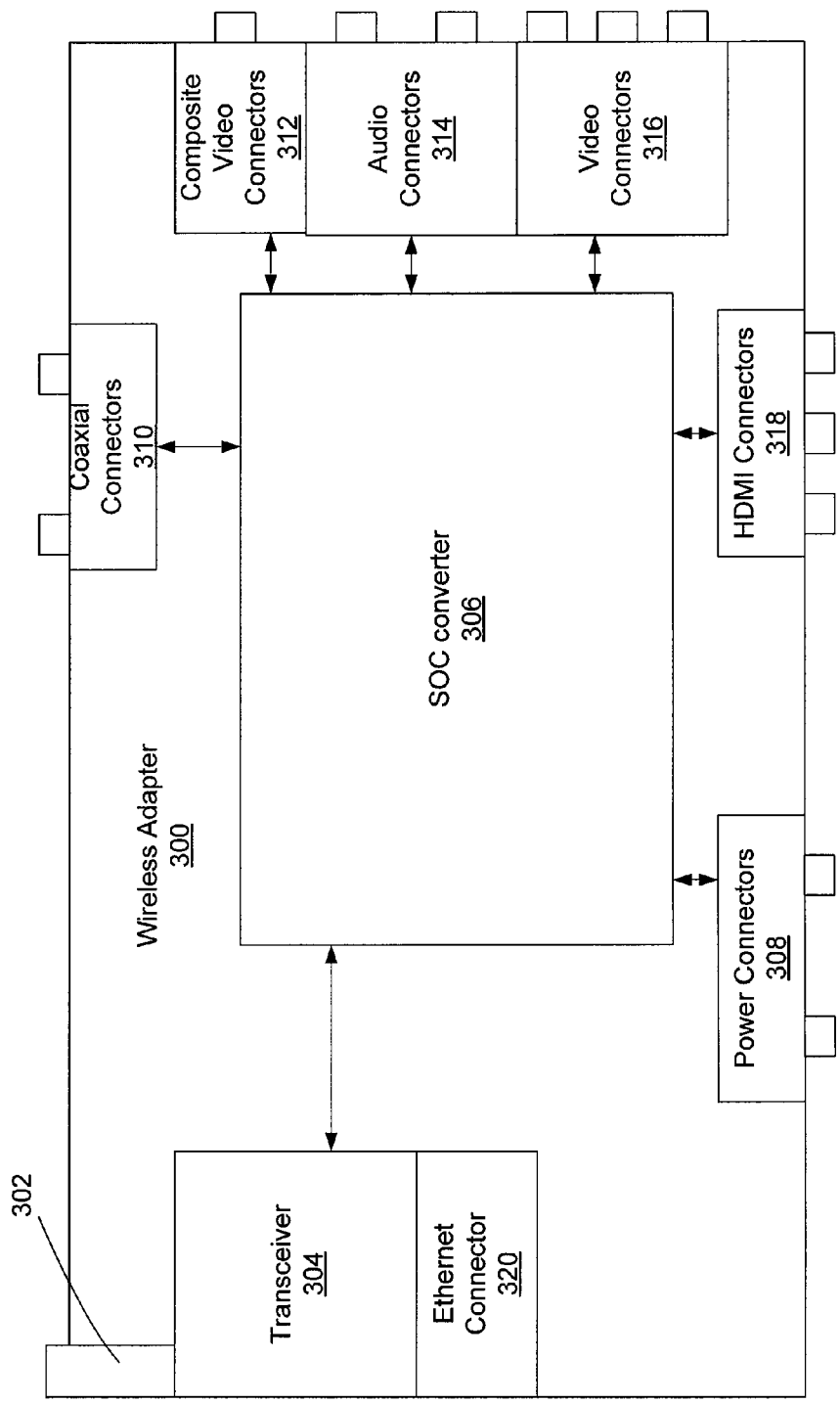
FIG. 3 is a block diagram of an adapter in accordance with an illustrative embodiment.

FIG. 3 is a block diagram of an adapter in accordance with an illustrative embodiment. The wireless adapter 300 is a particular implementation of the powerline adapter 104 or wireless adapters 106 and 108 of FIG. 2. In one embodiment, the wireless adapter 300 may include an antenna 302, transceiver 304, system-on-chip converter (SOC) 306, power connectors 308, coaxial connectors 310, composite video connectors 312, audio connectors 314, video connectors 316, a HDMI connectors 318, and Ethernet connector 320.

As shown in FIG. 3, the wireless adapter 300 may include the antenna 302. The antenna 302 is a wireless transmission device for transmitting signals to and receiving signals from the set-top box. The antenna 302 may be integrated as part of the body of the wireless adapter 300 or may extend from the body of the wireless adapter 300 based on the distance from the set-top box.

The SOC converter 306 is one embodiment of a converter that may be utilized to generate multiple formatted signals for output by the wireless adapter 300. The type of format may vary for each of the connectors or ports illustrated in the wireless adapter 300. The wireless adapter may include numerous connectors or ports that may be utilized to communicate the formatted signal from the wireless adapter 300 to a display. The type of display may indicate or require a specific connection and format type. For example, a standard television may only have coaxial connectors 310. As a result, the SOC converter 306 may convert the wireless signal received through the transceiver 304 to a coaxial signal for transmission through the coaxial connectors 310 to the television. The SOC converter 306 may convert digital and analog signals in any number of high definition or standard formats for output through the connectors.

In another embodiment, the SOC converter 306 may also convert signals received from other devices for display by the wireless adapter 300. The power connectors 308, coaxial connectors 310, composite video connectors 312, audio connectors 314, video connectors 316, a HDMI connectors 318, and Ethernet connector 320 may include an input and output port. The receiver signal received through the input ports may be converted to any number of formats, standards, and protocols that corresponds to the respective connectors of the output ports. For example, an input port of the coaxial connectors 310 may receive an input from an outdated VCR that may be output by the SOC converter 306 in analog and digital formats to the various connectors. In another embodiment, the user may program the SOC converter 306 to output specific formats using a display and a remote control or by using interface elements, such as buttons, switches, touch screens, and other interface elements that provide user input for the SOC converter 306. As previously described, the SOC converter 306 may require an authentication key or code to enable the wireless adapter 300 to receive a signal from the set-top box and display the formatted signal to the television.

In another embodiment, the television may allow for a composite video connection, audio connection or other video connections that may be utilized through the composite video connectors 312, the audio connectors 314, and the video connectors 316. Similarly, the wireless adapter 300 may enable communication through the high definition media interface (HDMI) connectors 318. The wireless adapter may similarly include any number of connectors and the SOC converter 306 may format the wireless signal accordingly. In one embodiment, the wireless adapter 300 may be a standardized or universal wireless adapter that may be utilized for older displays, next generation televisions, and new monitors.

The power connectors 308 may allow the wireless adapter 300 to be powered and/or charged in any number of ways. In one embodiment, the power connectors 308 may allow the wireless adapter 300 to connect to a standard outlet or wall plug. In one embodiment, the power connectors 308 may include a USB connector or other port connector that allows the wireless adapter 300 to not only be powered, but also to transmit the signal from the SOC converter 306 to the television. The power connectors 308 may also be configured to receive a powerline signal through an outlet that is communicated to the SOC converter 306. The SOC converter 306 may extract the video signal and send the formatted signals to the appropriate connectors. Similarly, the Ethernet connector 320 may be configured to receive an Ethernet connection through a power line. The Ethernet or data connection received through the power lines systems and lines of a home may be extracted by the Ethernet connector 320 to be processed by the SOC converter 306.

The different connectors may also include an S-video connector, DVI connector or jack, firewire connector or short range wireless transmitter configured to broadcast from the wireless adapter 300 to the television within the same room or a lesser distance. The connectors may also include any number of component connectors, left/right audio connectors and video connectors, coaxial, digital connectors, and optical connectors.

Figure 4:
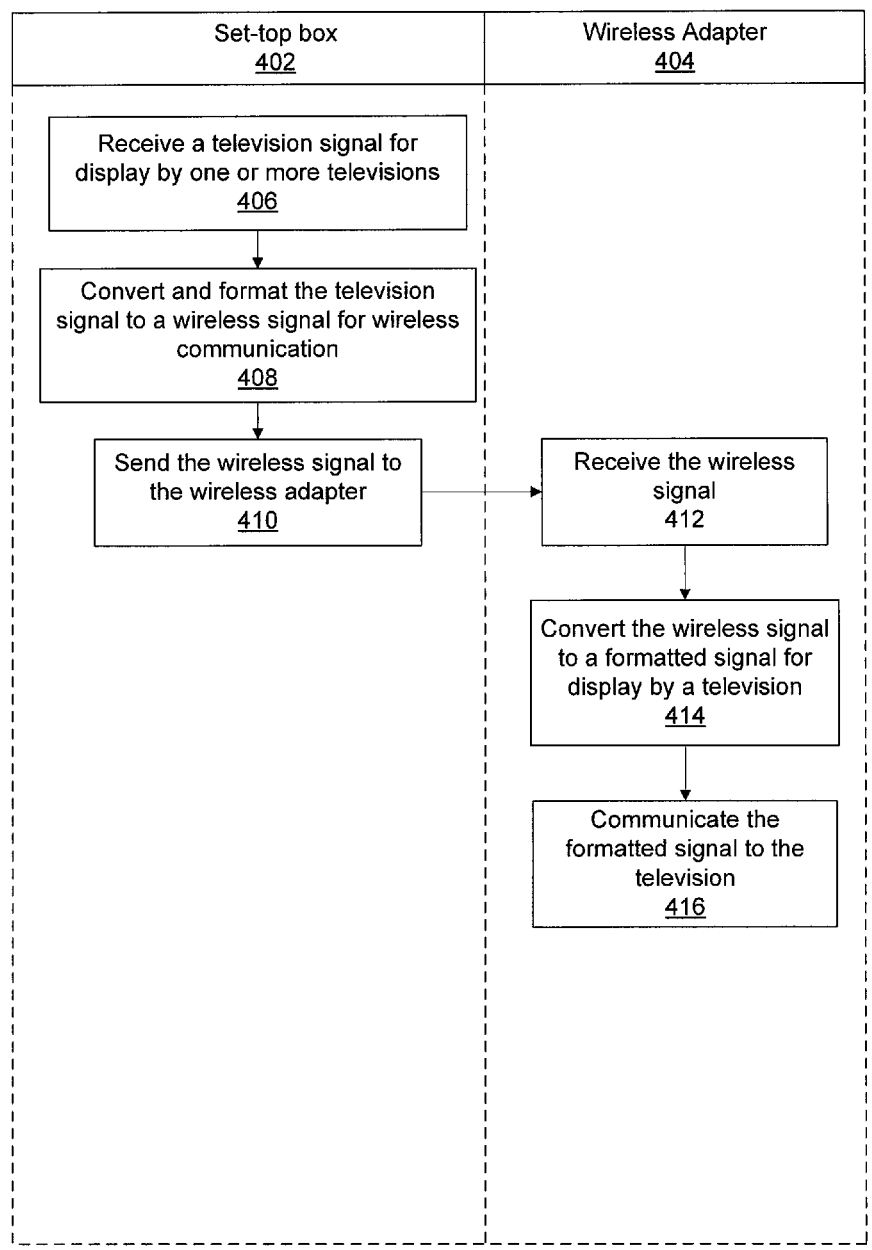
FIG. 4 is a flowchart of one embodiment of a process for communicating a television signal between a set-top box and one or more adapters.

FIG. 4 is a flowchart of one embodiment of a process for communicating a television signal between a set-top box and one or more adapters. The process of FIG. 4 may be implemented by a set-top box 402 and a wireless adapter 404 and/or a powerline adapter. For purposes of simplicity the adapter is referred to as a wireless adapter 40 even though it may be a powerline adapter.

The process of FIG. 4 may begin by receiving a television signal for display by one or more televisions (step 406). As previously described, the televisions are examples of one or more displays that may be utilized by the wireless adapter 404. The television signal may be a cable television, IPTV, satellite, analog signal, wireless signal or other data connection. The set-top box 402 converts and formats the television signal to a wireless signal for wireless communication (step 408). The set-top box 402 may use any number of radio frequencies or wireless signals in order to transmit the wireless signal from the set-top box 402 to one or more wireless adapters. In one embodiment, the set-top box 402 may use a next generation WiFi, Bluetooth or other signal intended for use by a home, business organization or other group. For example, the television signal may be formatted to an IEEE 802.11(n) signal that may utilize different channels or frequencies for each of the applicable wireless adapters. Similarly, the set-top box 402 may format the signal for communication through power lines. In one embodiment, the television signal may be partitioned or streamed to the set-top box 402 in separate channels, videos, and streams for receipt and display by any number of televisions.

Next, the set-top box 402 sends the wireless signal to the wireless adapter (step 410). The wireless signal described in FIG. 4 may also be replaced by a powerline signal that may be sent and received by the wired adapter. The wireless adapter 404 receives the wireless signal (step 412). In the embodiment of the wired adapter, the powerline signal may need to be extracted from a power connection.

Next, the wireless adapter 404 converts the wireless signal to a formatted signal for display by a television (step 414). During step 414, the converter of the wireless adapter 404 may decode, convert or format the wireless signal or powerline signal to be outputted through any number of connectors or ports of the wireless adapter 404 based on the user's selection of the output format or available technology on the television. Beginning in 2009 or thereafter, all television signals will be required to be broadcast in a digital signal. As a result, the wireless adapter 404 may convert the digital signal to an analog signal that may be utilized by an older television set.

Next, the wireless adapter 404 communicates the formatted signal to the television (step 416). The formatted signal may be communicated through a port of the wireless adapter 404 or powerline adapter. In another embodiment, a short range radio frequency or infrared signal may transmit the formatted signal to the television. In another embodiment, the formatted signal may be communicated to the television through a power cord or connection of the television. For example, the wireless adapter 404 may be integrated with an alternative current (AC) adapter that plugs into a wall, plug or utility socket and the television in turn plugs into the AC adapter. The formatted signal may be received through the AC adapter/wireless adapter 404.

Figure 5:
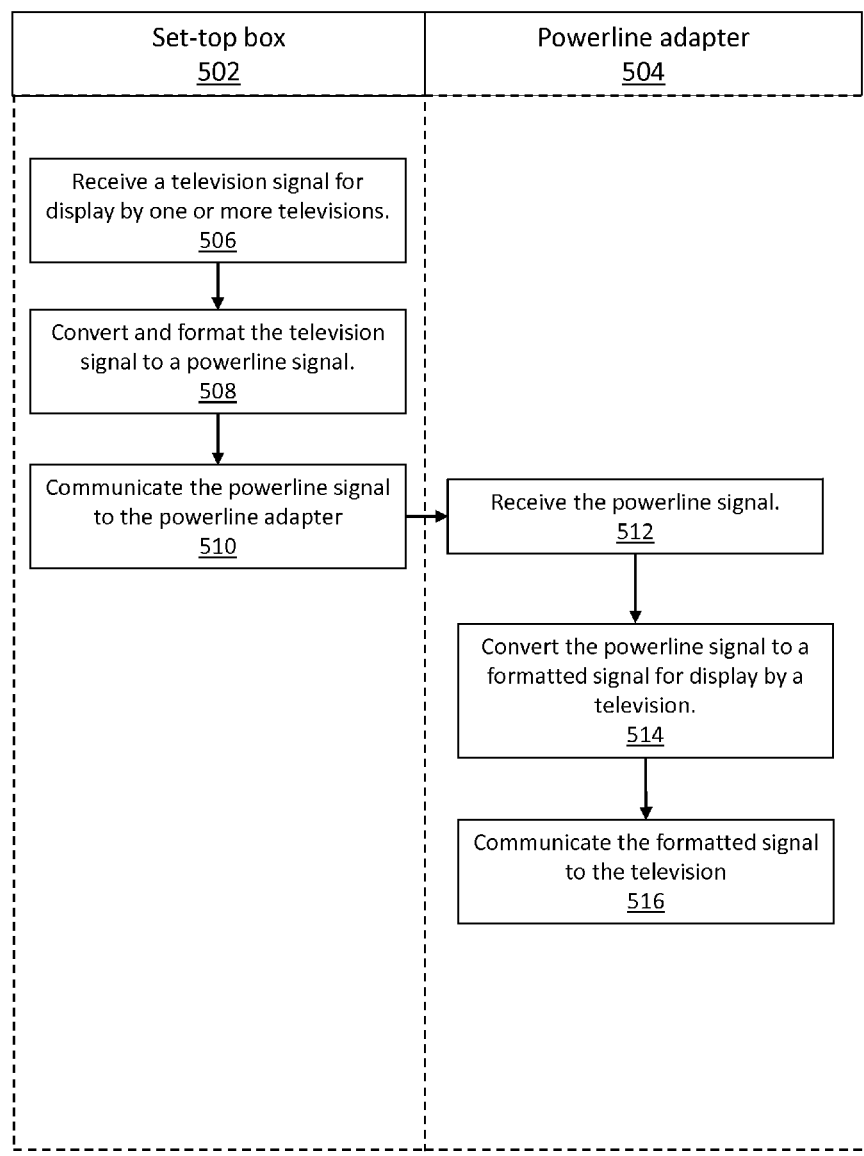
FIG. 5 is a flowchart of one embodiment of a process for communicating a television signal between a set-top box and a powerline adapter.

FIG. 5 is a flowchart of one embodiment of a process for communicating a television signal between a set-top box and a powerline adapter. The process of FIG. 5 may be implemented by a set-top box 502 and powerline adapter 504.

The process of FIG. 5 may begin by receiving a television signal for display by one or more televisions (step 506). As previously described, the televisions are examples of displays, including computer monitors, wireless devices, plasma or LCD televisions or other devices that may be utilized by the powerline adapter 504. The television signal may be a cable television, IPTV, satellite, analog signal, powerline signal or other data connection.

The set-top box 502 converts and formats the television signal to a powerline signal (step 508). The set-top box 502 may use any number of powerline signal standards, protocols or frequencies in order to transmit the powerline signal from the set-top box 502 to one or more powerline adapters. In one embodiment, the set-top box 502 may use a next generation powerline Ethernet signal intended for use by a home, business organization or other group. In one embodiment, the television signal may be partitioned or configured to be streamed to the set-top box 502 in the powerline signal in separate channels, videos, and streams for receipt and display by any number of televisions.

Next, the set-top box 502 communicates the powerline signal to the powerline adapter (step 510). In one embodiment, the set-top box 502 may require that the powerline adapter 504 or wireless adapter is registered to receive communications. For example, a key or identifier may be required to send and receive communications, decode the powerline signal or otherwise secure the connection between the set-top box 502 and the powerline adapter 504. Any number of other systems, standards or protocols may be utilized to ensure that the powerline or wireless signals are sent to an authorized device utilizing a secure transmission method.

Next, the powerline adapter 504 receives the powerline signal (step 512). During step 512, the powerline signal may need to be extracted from a power connection. The powerline adapter 504 may receive the signal through the power connections of a building. For example, the powerline adapter may be connected directly or indirectly to an electrical outlet to receive the powerline signal. As previously described, the powerline adapter 504 may be integrated with an alternative current (AC) adapter that plugs into a wall, plug or utility socket and the television in turn plugs into the AC adapter. The powerline signal may be received through the AC adapter/powerline adapter 504.

Next, the powerline adapter 504 converts the powerline signal to a formatted signal for display by a television (step 514). During step 514, the converter of the powerline adapter 504 may decode, convert or format the powerline signal to be outputted through any number of connectors or ports of the powerline adapter 504 based on the user's selection of the output format or available technology on the television. For example, the powerline adapter 504 may include an HDMI port for communicating the formatted signal to the television. In another example, the powerline signal may be conveyed to the television as a reformatted powerline signal that may be extracted from a power connection of the television for display. The powerline adapter 504 may include any number of connectors, cords or other interface elements.

Next, the powerline adapter 504 communicates the formatted signal to the television (step 516). The formatted signal may be communicated through a port or connector of the powerline adapter 504. For example, audio and video interfaces may be externally connected to the powerline adapter 504 and the television. A short range radio frequency or infrared signal may also transmit the formatted signal to the television.

The previous detailed description is of a small number of embodiments for implementing the invention and is not intended to be limiting in scope. The following claims set forth a number of the embodiments of the invention disclosed with greater particularity.

What is claimed:

1. A method for distribution of media signals, the method comprising:

establishing wireless communications between one set-top box and at least a first wireless adapter, a second wireless adapter and a powerline adapter wherein the wireless communication between the set top box and the first wireless adapter is transmitted at a first dedicated radio transmission frequency and wherein the wireless communication between the set top box and the second wireless adapter is transmitted at a second dedicated radio transmission frequency which is different than the first dedicated radio transmission frequency, and wherein the powerline communication signal between the set-top box and the powerline adapter is transmitted according to a powerline signal standard and further wherein each of the first and second wireless adapters and the powerline adapter are in communication with a separate television, and wherein the wireless adapters are powered by the associated television;

receiving a separate signal from the set-top box at each wireless adapter and at the powerline adapter, each of the separate signals including media content selected for display on the associated television, each of the separate signal being formatted for wireless communications or powerline communications;

converting each of the separate signals to a format displayable by the associated television, wherein each of the wireless adapter and the powerline adapter is operable to format the signal to at least a high definition format and a standard definition format corresponding to capabilities of the associated television; and communicating the formatted signal from each wireless adapter and the powerline adapter to the associated television.

2. The method according to claim 1, wherein at least one of the first and second wireless adapters is a dongle.

3. The method according to claim 1, wherein each one of the first and second wireless adapter and the powerline adapter includes a plurality of connectors configured to connect the wireless adapter or powerline adapter to a television for communicating the formatted signal.

4. The method according to claim 3, wherein a system on a chip of at least one of the first and second wireless adapters converts the signal to a plurality of formats for each of the plurality of connectors.

5. The method according to claim 4, wherein the plurality of connectors include any of a coaxial connection, composite video, right and left audio connectors, component video connectors, high definition multimedia interface (HDMI) connectors, and a universal serial bus connector.

6. The method according to claim 1, wherein at least one of the first and second wireless adapters is powered by a universal serial bus connection with the television.

7. The method according to claim 1, wherein the wireless communications are transmitted using any of a WiFi signal, wireless Ethernet, and a Bluetooth signal and wherein the powerline communications are transmitted using powerline Ethernet.

8. The method according to claim 1, wherein the set-top box receives a cable television signal, satellite signal or an Internet Protocol television signal.

9. The method according to claim 1, wherein at least one of the first and second wireless adapters is integrated with an alternating current adapter the television is connected to in order to be powered, wherein the formatted signal is communicated to the television through a power cord of the television, and wherein the television extracts the formatted signal from the power cord for display.

10. A system for communicating a media signal to multiple displays, the system comprising:

a set-top box configured to convert a received media signal to a separate first wireless signal for transmission over a first dedicated radio transmission frequency and to convert the received media signal to a separate second wireless signal for transmission over a second dedicated radio transmission frequency which is different from the first dedicated radio transmission frequency and to convert the received media signal to a separate powerline signal; and first and second wireless adapters in wireless communications with the set-top box and a powerline adapter in wired communication with the set-top box, the first wireless adapter configured to receive the separate first wireless signal transmitted over the first dedicated radio transmission frequency, the second wireless adapter configured to receive the separate second wireless signal transmitted over the second dedicated radio transmission frequency and the powerline adapter configured to receive the separate powerline signal, wherein each wireless adapter and the powerline adapter are further configured to convert the received signal to a signal formatted according to a format of one or more of multiple displays with at least one display being associated with the first wireless adapter, another display being associated with the second wireless adapter and another display being associated with the powerline adapter, and communicate the formatted signal to the associated displays through a hardware interface, the associated displays being operable to power the wireless adapters to perform the wireless communications with the set-top box.

11. The system according to claim 10, wherein the first and second wireless communications signals are any of a WiFi signal, wireless Ethernet, and a Bluetooth signal and wherein the powerline signal is a powerline Ethernet signal.

12. The system according to claim 10, wherein the one or more of the first and second wireless adapters is a dongle, the dongle is powered and communicates the formatted signal through a USB connection with one of the one or more displays.

* * * * *